INVENTORS
ROBERT N. BARTLETT
WILLIAM F. PENDERGAST

ATTORNEY

United States Patent Office 3,509,665
Patented May 5, 1970

3,509,665
ROLLER AND TRACK SYSTEM
Robert N. Bartlett and William F. Pendergast, Grand Rapids, Mich., assignors to Steelcase, Inc., Grand Rapids, Mich., a corporation of Michigan
Filed Feb. 28, 1968, Ser. No. 708,986
Int. Cl. E05d 13/02
U.S. Cl. 49—410　　　　　　　　　　　　　　4 Claims

ABSTRACT OF THE DISCLOSURE

This disclosure relates to a roller and track system for sliding doors and the like, wherein a grooved wheel rides on a raised rib track. The grooved wheel contains a pair of annular rubbery tires which provide a noise reducing barrier between the wheels and the raised rib track.

---

This invention relates to a roller and track system. In one of its aspects it relates to furniture construction in which a grooved wheel rides on a raised rib track between two moving components wherein a noise reducing barrier means is provided between the wheel and the raised rib track, the barrier means circumscribing the wheel and being constructed out of a softer material than the roller and the raised rib track.

In copending Ser. No. 696,903, filed Jan. 10, 1968, entitled, Sliding Door Construction, there is disclosed and claimed a roller and track system for sliding doors and the like. The doors contain a plurality of wheels having cutaway annular portions which ride on raised rib tracks.

Since the wheels and the raised rib tracks must be made of strong hard material, considerable amounts of noise result when rolling the wheels on the raised rib tracks.

We have now discovered a roller and raised rib track construction for doors, cabinets, and the like, wherein rolling noise is substantially reduced by the use of rubberlike tires positioned within the annular cutaway portion so that the tires ride on the track and the hard surfaced wheel does not contact the track.

By various aspects of this invention, one or more of the following, or other, objects can be obtained.

It is an object of this invention to provide a sliding door construction wherein the door is moved with a substantially noiseless motion.

It is a further object of this invention to provide a wheel and track construction for sliding doors, drawers, and the like wherein noise due to rolling of hard wheels on a hard track is substantially reduced.

Other aspects, objects, and the several advantages of this invention are apparent to one skilled in the art from a study of this disclosure, the drawings, and the appended claims.

According to the invention, there is provided a wheel and track construction for doors, cabinets, and the like, wherein the wheel is grooved and rides on a raised rib track. The grooved wheel contains a circumscribing noise reducing barrier means which is constructed of a softer material than the wheel or the track and prevents the wheel from contacting the track.

The grooved wheel preferably has a pair of annular concave grooves on either side of a cutaway portion, in which grooves are positioned a pair of resilient annular tires forming the barrier means. The grooves and tires are so positioned as to straddle the raised rib track and to provide the sole contact between the wheel and the raised rib track.

Figure 1:
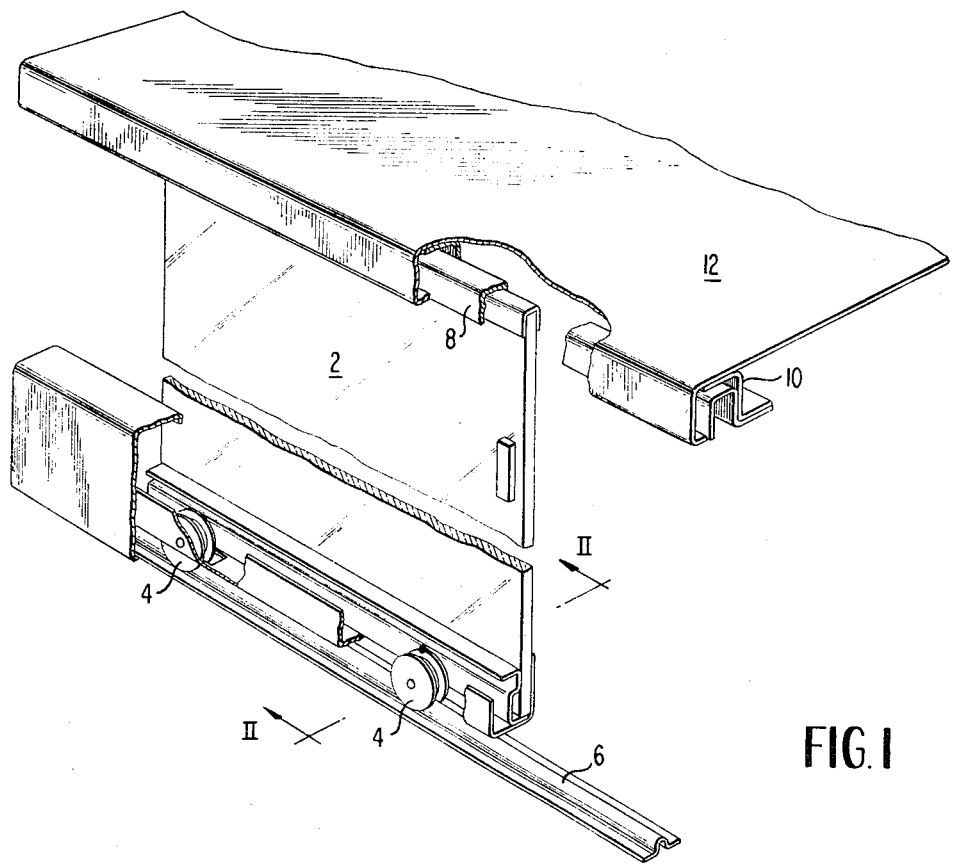
Figure 2:
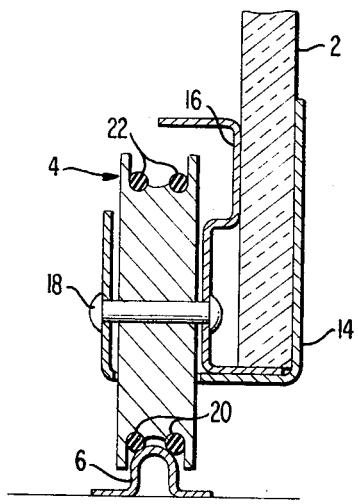

The invention will now be described with reference to the accompanying drawings in which:

FIG. 1 is a perspective view, partially broken away, of an embodiment of the invention; and FIG. 2 is a sectional view through lines II of FIG. 1.

Referring now to the drawings, a sliding door 2 for a cabinet, for example, slides on wheels 4 which are guided by a raised rib track 6. A top guide bracket 8 positions the top portion of door 2 for sliding movement on wheels 4. The top guide 8 is attached to a top panel 12 through a bracket 10.

The wheels 4 are supported by an axle 18 which is held by a U-shaped bracket 14 on one side and a bracket 16 on the other side. In FIG. 1, portions of the bracket 14 are broken away to show the position of the wheels 4 relative to door 2. Bracket 16 and bracket 14 hold door 2 in place.

According to the invention, the wheel contains an annular cutaway central portion having annular concave grooves 20 and rubber O-ring tires 22 positioned in the annular concave grooves 20. The rubber O-ring tires ride on the raised rib track 6 and substantially eliminate the noise from contact of two hard surfaces of the wheel and the raised rib track 6.

The construction shown in the drawings is particularly useful in doors, drawers, cabinets, and the like wherein rollers are employed on a moving member and a raised rib track is employed on a stationary member. Alternately, the grooved roller could be used on the stationary member and the raised rib track could be used on the moving member.

The wheels, of necessity, must be formed from a hard surfaced structural material such as metals, or synthetic plastic material such as nylon, high density polyethylene, polypropylene, polyvinyl chloride, acrylic resins, and the like.

The raised rib track is preferably formed out of metal although it can be formed out of other materials, such as the above listed synthetic plastic materials.

The tire wheels which provide the noise reducing barrier must be softer than both the raised rib track and the wheels. Suitable materials for the wheels include natural and synthetic rubbery polymers such as neoprene, silicone rubber, polybutadiene, and the like.

Reasonable variation and modification are possible within the scope of the foregoing disclosure, the drawings, and the appended claims of the invention without departing from the spirit thereof.

The embodiments of the invention in which an exclusive property or privilege is claimed are defined as follows:

1. In a furniture construction in which a grooved wheel made from a metallic or synthetic plastic material rides on a raised rib track between two moving components, said track being made from a metallic or synthetic plastic material, the improvement which comprises a noise reducing barrier means between said wheel and said raised rib of said track, said barrier means circumscribing said wheel and constructed out of a softer material than said wheel and said raised rib track.

2. A cabinet construction having a top, side walls, and sliding door panels forming a front for said cabinet, door guiding means on said cabinet and wheels on said door panels, said door guiding means and said wheels being constructed according to the furniture construction of claim 1.

3. In a furniture construction in which a grooved wheel rides on a raised rib track between two moving components, the improvement which comprises a noise reducing barrier means between said wheel and said raised rib of said track, said barrier means circumscribing said wheel and constructed out of a softer material than said wheel and said raised rib track, said wheel having an annular cutaway central portion and a pair of annular concave grooves on either side of said cutaway portion, said barrier means comprising a pair of resilient annular tires positioned in said grooves such that said tires straddle said rib track and provide the sole contact between said wheel and said ribbed track.

4. A furniture construction according to claim 3 wherein said tires are constructed of a soft rubbery material.

References Cited

UNITED STATES PATENTS

| | | | |
|---|---|---|---|
| 2,632,199 | 3/1953 | Rissler | 16—107 |
| 3,224,381 | 12/1965 | Stewart | 16—107 |
| 3,248,822 | 5/1966 | Sincock | 49—425 |

DAVID J. WILLIAMOWSKY, Primary Examiner

J. K. BELL, Assistant Examiner

U.S. Cl. X.R.

49—425; 16—91, 98; 312—330